May 25, 1926.
E. R. DURGIN
TEMPLE BAR CONNECTION
Filed August 16, 1924
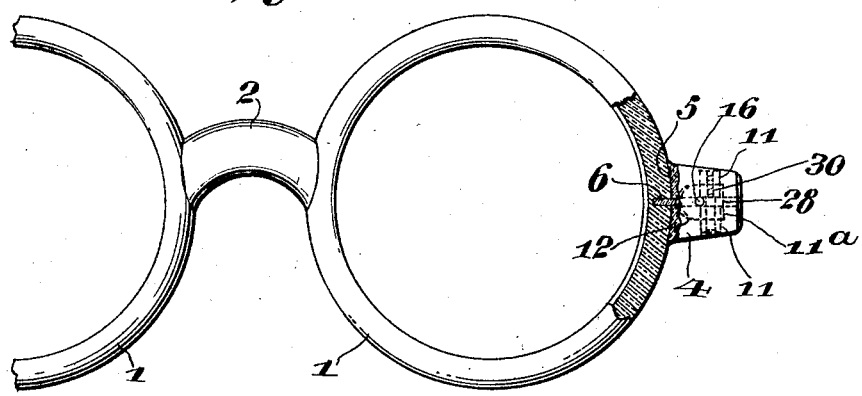
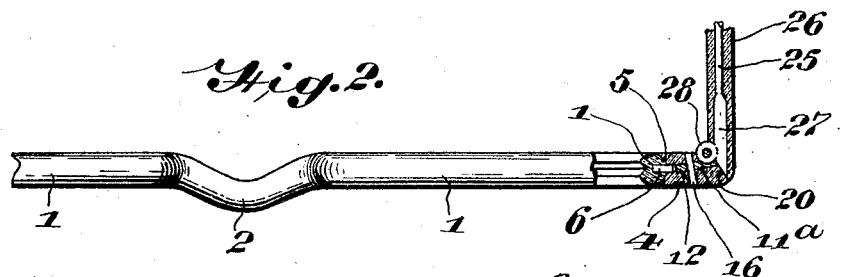
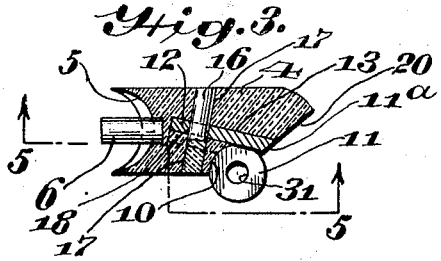
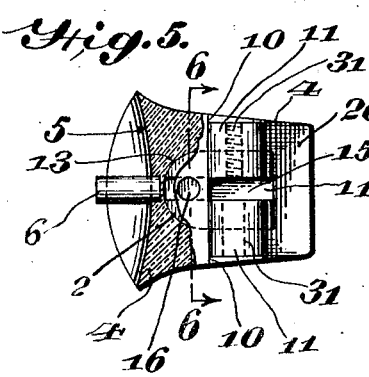
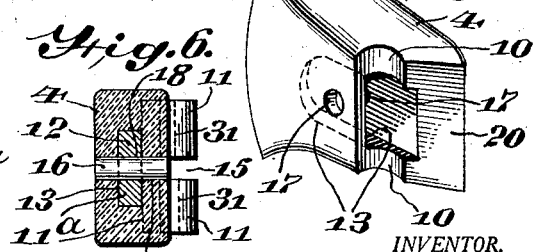
INVENTOR.
Edgar R. Durgin
BY Cyrus N. Anderson
ATTORNEY.

Patented May 25, 1926.

1,585,836

UNITED STATES PATENT OFFICE.

EDGAR R. DURGIN, OF NEWARK, NEW JERSEY, ASSIGNOR, BY MESNE ASSIGNMENTS, TO CONTINENTAL OPTICAL CORPORATION, OF NEW YORK, N. Y., A CORPORATION OF DELAWARE.

TEMPLE-BAR CONNECTION.

Application filed August 16, 1924. Serial No. 732,401.

My invention relates broadly to ophthalmic mountings consisting of non-metallic material, for example zylonite.

The general object of the invention is to provide a construction of mounting in which material which heretofore has gone to waste may be employed in making connection between the rims of spectacle frames and the front ends of the temple bars.

A more specific object of the invention is to provide an improved and novel construction of means for connecting the front ends of the temple bars of non-metal spectacle frames with the outer sides of the lens rims; that is, to the outer ends of the frames.

It is also an object of the invention to provide a novel construction of connection between a temple bar and the outer side of an eye-glass rim, which connection shall comprise a metal hinge member.

To these and other ends my invention comprehends the construction and arrangement of parts as hereinafter described in detail and as illustrated in the drawing, in which I have illustrated one convenient form of embodiment of the invention. It will be understood, however, that the invention is susceptible of embodiment in other forms of construction than that shown and that changes in the details of construction may be made within the scope of the claims without departing from the principle thereof.

In the drawing,—

Fig. 1 is a view partly in front elevation and partly in vertical section of an ophthalmic mounting embodying the invention, the said section being taken in a plane centrally of a rim and substantially parallel with the front and rear sides thereof;

Fig. 2 is a view partly in top plan and partly in horizontal section of the mounting shown in Fig. 1;

Fig. 3 is a horizontal section through a temple bar connecting lug separate from the spectacle frame, one element of a metallic hinge member being secured thereto;

Fig. 4 is a perspective view of the metallic hinge element shown in Fig. 3;

Fig. 5 is a sectional view taken on the line 5—5 of Fig. 3;

Fig. 6 is a transverse section taken on the line 6—6 of Fig. 5; and

Fig. 7 is a view in perspective of a non-metal temple lug separate from the frame and other parts of the connection.

Referring to the drawing, 1 designates the lens rims of a pair of spectacles consisting of celluloid zylonite or other suitable non-metallic material. These rims are connected together by means of a bridge 2.

The rims of eye-glasses or spectacle frames consisting of zylonite or other like or equivalent material are usually formed by cutting or stamping the same from flat sheets thereof. The central oval or circular portions of the sheets formed by cutting out the rims have, for the most part, heretofore constituted waste material.

In the practicing of my invention I employ there heretofore waste portions for the purpose of making the temple lugs of spectacle frames. These lugs, designated 4 in the drawing, are formed from these oval or circular portions which heretofore were discarded and wasted.

The temple lugs 4, shown in detail in Fig. 7 of the drawing, respectively comprise upon their inner ends hollowed out portions, as indicated at 5, which constitute seats in which the outer edges of the rims 1 are adapted to be placed. The said lugs are then connected to the rims by means of a suitable cement. In practice such connection is effected by slightly warming either the lug or the rim or both and applying to the surface at 5 a liquid solvent which will soften the material so that when the two parts are pressed together they adhere to each other. For the purpose of reinforcing the connection between the temple lugs 4 and the rims I employ pins, as indicated at 6 in the drawing, which extend partially through the rims 1 and outwardly into the lugs 4.

Preferably, before attaching a lug to a rim, the rear edge portion of its outer end is provided with a semi-cylindrical seat 10, within which the cylindrical knuckle portions 11 of one member 11ª of a hinge connection is adapted to be seated. The said member is provided with a bar-like portion 12, which is adapted to enter and to be secured in an opening 13 extending longitudinally of the lug 4. It will be noted that the cylindrical knuckle portions 11 are separated from each other by a slot 15. The bar or tongue portion 12 having been inserted within the longitudinally extending opening 13 so that the inner sides or portions of the knuckles 11 are well seated within the seat 10, a pin 16 of zylonite or other suitable material is inserted through openings 17 and 18 through the lug 4 and the bar or tongue 12 respectively, so that the latter is securely held in place.

The surfaces 20 of the outer ends of the temple lugs 4 occupy planes which extend diagonally of the plane of the rims of the spectacles.

The temple bars each consist of a central metal wire 25 inclosed by a sheathing or tube of non-metallic material 26, such as zylonite. The inner end of each wire is flattened, as indicated at 27, and is provided with a single knuckle or ring-like part 28 which is adapted to fit within the slot 15 between the knuckles 11. Pivotal connection between the parts of the hinge is effected by the pintle or pivot 30 which extends through openings 31 in the knuckles 11 and through an opening in the part 28.

The surface of the forward end of each of the temple wires 25 is inclined to the length of the bar, as is also the surface of the forward end of the sheath or covering 26, so that when a temple bar is in open position the forward surfaces of the parts 25 and 26 contact with the outer surface of the temple lug to which they are connected so as to form a miter joint. When in open position it will be apparent that no part of the metal embodied in the connection structure is visible from the exterior. When the temple bars are in closed position the outer ends of the hinge members connected to the temple lugs 4 of a pair of spectacles are visible as well also as the outer ends of the rods 25.

Having thus described my invention, what I claim and desire to secure by Letters Patent is:

1. A temple bar connection for non-metallic ophthalmic mountings comprising a non-metallic lug secured to the outer edge of a rim, a pin extending across the connection between the said rim and said lug and into both the rim and the lug to reinforce the said connection, a temple bar, a hinge element carried by said lug, and a hinge element carried by said temple bar, which elements are pivotally connected together.

2. A temple bar connection for non-metallic ophthalmic mountings, comprising a non-metallic lug connected with the outer edge of a rim, the said rim being provided with a hole extending thereinto and the said lug being provided with a hole extending thereinto from the inner end, which holes are in registry with each other, a pin located in said holes, the outer end of said pin terminating a distance from the outer end of the hole through the said lug, a hinge element mounted on the outer end of said lug and having a portion projecting into the opening through the said lug and a temple bar having a hinge element upon its inner end, the said hinge elements being pivotally connected together.

3. A temple bar connection for non-metallic ophthalmic mountings, comprising a non-metallic lug connected to the outer edge of a rim, the said rim having a hole extending thereinto, and the said lug having a hole extending thereinto from the inner end and being in registry with the hole in the said rim, a pin located within said holes to reinforce the connection between said rim and said lug, a temple bar and a hinge connection between the inner end of said bar and the outer end of said lug.

4. A temple bar connection for non-metallic ophthalmic mountings, comprising a lug secured to the outer side of a rim for holding a lens, the said lug being provided with an opening extending longitudinally thereof from its outer end toward its inner end, and also being provided with a semi-cylindrical seat upon the rear edge portion of its outer end, a hinge element comprising knuckles and a bar portion which are adapted to fit within the said opening and the said seat, means for securing the said element to the said lug, a temple bar comprising a wire enveloped within a tube of non-metallic material, the front end of said wire being flattened and being provided with a ring-like projection which is adapted to be located between the said knuckles, and means for pivotally connecting the said ring-like projection and the said knuckles together.

5. A temple bar connection for non-metallic ophthalmic mountings, comprising a lug of non-metallic material secured to the outer side of a non-metallic rim, the said lug being provided with an opening extending from the outer toward the inner end thereof, and being also provided upon its rear outer edge portion with a transversely extending seat, and the surface of the outer end of said lug being inclined from the rear side thereof outwardly, a hinge element secured in the said opening and seat, a temple bar comprising a metal wire enveloped in a tube of non-metallic material, the front end of said wire being provided with a ring-like projection constituting the other element of the said hinge connection, and the forward surface of the said temple bar being inclined with respect to the length thereof so that when the said temple bar is in open position the front end thereof forms with the outer end of the said lug a miter joint, and means for pivotally connecting the said hinge elements.

6. A temple bar connection for non-metallic ophthalmic mountings, comprising a non-metallic lug secured to the outer side of a lens rim, which lug is provided with an opening extending from the outer toward the inner end and also with a semi-cylindrical seat upon the rear portion of its outer end, a metallic hinge element consisting of a bar-like portion and knuckles secured to the outer end thereof, the said knuckles being spaced from each other, and the said bar-like portion and the knuckles adapted to be seated within the said opening and seat, non-metallic means extending transversely through the said lug and bar for securing the latter to the former, a temple bar consisting of a metal wire enveloped by a tube of non-metallic material, the inner end of said wire being flattened and terminating in a single knuckle constituting the other element of the said hinge connection, which element is adapted to be positioned between the first named knuckles, and a pivot pin adapted to extend through said knuckles for pivotally connecting the same together.

In testimony that I claim the foregoing as my invention, I have hereunto signed my name this 1 day of August, 1924.

EDGAR R. DURGIN.